United States Patent
Pregeant, Jr. et al.

(10) Patent No.: US 6,783,054 B1
(45) Date of Patent: Aug. 31, 2004

(54) SYSTEM FOR CONTROLLABLY CONDUCTING WELDING OPERATIONS ADJACENT FLAMMABLE MATERIALS AND METHOD OF WELDING ADJACENT FLAMMABLE MATERIALS

(76) Inventors: Clyde W. Pregeant, Jr., 12201 W. Ave. B, Cut Off, LA (US) 70345; Richard J. Pregeant, 203 Chateau Dr., Lochport, LA (US) 70374; Mark A. Pregeant, 135 W. 145th St., Galliano, LA (US) 70354; Glenn R. Payton, 1463 Flamingo Dr., Gretna, LA (US) 70056; James R. Craig, 240 Saxony Ct., Belle Chasse, LA (US) 70037

( * ) Notice: Subject to any disclaimer, the term of this patent is extended or adjusted under 35 U.S.C. 154(b) by 12 days.

(21) Appl. No.: 10/155,716

(22) Filed: May 20, 2002

(51) Int. Cl.⁷ .............................. B23K 9/10; B23K 31/02
(52) U.S. Cl. ........................... 228/102; 103/8; 103/119; 219/72; 219/130.01; 454/228
(58) Field of Search .................................. 228/102, 103, 228/8, 9, 119; 219/72, 130.01, 130.02; 454/49, 56, 228; 52/2.17; 135/900

(56) References Cited

U.S. PATENT DOCUMENTS

| | | | |
|---|---|---|---|
| 3,452,764 A | 7/1969 | Bell ............................... 135/1 |
| 3,946,571 A | 3/1976 | Pate et al. ...................... 61/69 |
| 4,091,719 A | * 5/1978 | Galloway .................... 454/253 |
| 4,151,396 A | * 4/1979 | Veal ............................ 219/132 |
| 4,297,940 A | 11/1981 | Hainline ......................... 98/33 |
| 4,606,260 A | * 8/1986 | Cox ............................. 454/56 |
| 4,767,913 A | * 8/1988 | Weber et al. .......... 219/130.21 |
| 5,026,219 A | 6/1991 | Wallace ....................... 405/303 |
| 5,101,604 A | 4/1992 | Wardlaw, III ................ 52/2.17 |
| 5,410,120 A | * 4/1995 | Taylor .......................... 219/72 |
| 6,540,603 B1 | * 4/2003 | Koskinen ..................... 454/58 |

* cited by examiner

Primary Examiner—Kiley Stoner
Assistant Examiner—Kevin McHenry
(74) Attorney, Agent, or Firm—Baker Donelson

(57) ABSTRACT

A system (10) for conducting welding adjacent flammable materials (12) on a platform (11) is disclosed having a chamber (13) defining an interior space (16). The system also includes a welding apparatus (48) operable within the interior space. A sensor (54) is provided for sensing the presence of combustible gas within the interior space above a pre-selected level and generating a signal. An exterior sensor (57) is provided for sensing the presence of combustible gas outside the interior space above a pre-selected level and generating a signal. A controller (66) is in communication with the welding apparatus, the sensor, and the exterior sensor to control the operations of the welding apparatus in response to signals received from the sensor.

18 Claims, 2 Drawing Sheets

SYSTEM FOR CONTROLLABLY CONDUCTING WELDING OPERATIONS ADJACENT FLAMMABLE MATERIALS AND METHOD OF WELDING ADJACENT FLAMMABLE MATERIALS

TECHNICAL FIELD

This invention relates generally to systems for controlling industrial environments, and particularly to systems for controlling welding environments adjacent flammable materials and methods for concurrently conducting welding and drilling operations adjacent one another.

BACKGROUND OF INVENTION

Drilling facilities, such as offshore platforms, are commonly constructed and maintained in remote areas of the world for use in drilling petroleum from the subterranean. Oftentimes, such drilling facilities are subjected to rigorous use as well as harsh weather conditions. Pipelines, drilling equipment, storage tanks, and decking on such facilities are routinely in need of repairs which require welding and cutting to be conducted.

In performing welding, intense heat is used to melt metals together and cause them to become integrally joined when cooled. A welding torch fueled by gas or a TIG (Tungsten Inert Gas) torch powered by a diesel or electric welding machine directs the intense heat to engage the subject metals. The force of the intense heat from a welding torch combined with the melting of metals generates sparks and slag that spray outwardly and fall downwardly from the subject metals that are being welded.

Conducting welding on petroleum drilling facilities is particularly dangerous due to the proximity of heat, sparks and slag to petroleum liquids and gases, which are flammable. Although petroleum is contained within pipelines or storage tanks, petroleum is often spilled or sprayed accidentally about a well or a drilling platform, for example, as a result of blow-out, breaches in seals, or similar conditions.

In addition to petroleum, other dangerously flammable materials exist on drilling facilities. For example, much of the heavy equipment used on a drilling platform, such as cranes, forklifts, and the like, are powered by gasoline, diesel or other fuels containing hydrocarbons that are flammable. In addition to the fuel tanks installed in such equipment, other containers for storing such fuels are often maintained on the drilling platform for re-fueling purposes.

Some safeguards have been taken to reduce the danger of igniting flammable materials on offshore platforms during welding operations. For example, drilling on offshore platforms is often ceased while welding is performed to reduce the risk of heat, sparks or slag inadvertently igniting petroleum that is being collected, processed and stored. Such cessations in drilling operations on a platform are known in the art as "shut-ins". Shut-ins are intended to prevent petroleum from flowing near welding operations. However, each shut-in may cost hundreds of thousands of dollars in lost production depending upon the duration of the shut-in.

Another safeguard that has been undertaken prior to performing welding on drilling platforms is that flammable materials within containers and equipment have been isolated from the area in which welding is to be performed. Preferably, welding operations are secluded to an open space separated from pipe lines and storage containers containing petroleum as well as equipment containing flammable fuel by a distance of at least 35 feet. However, on a drilling platform, such open and secluded space is often unavailable. Occasionally, petroleum can be re-routed or otherwise moved to another location to prepare an open and secluded area for welding. However, given the limited space on offshore petroleum platforms, welding operations are commonly required to be conducted within a few feet of petroleum or other flammable materials and therefore a shut-in must be instituted.

As shown in U.S. Pat. Nos. 3,452,764 and 5,101,604, tent-like shelters have been erected about pipelines and wellheads in an effort to protect welders from inclement weather. None of these shelters however, provide for conducting welding directly adjacent flammable materials, or conducting welding on surfaces other than horizontal surfaces. Additionally, capsules, such as those shown in U.S. Pat. Nos. 3,946,571 and 5,026,219, have been made portable and have provided ventilation for welders. While such prior art capsules disclose the provision of some ventilation for welders, none of the systems associated therewith disclose controls sufficient to minimize the dangers of igniting flammable liquids and gases located adjacent welding operations so that welding and drilling operations may be performed simultaneously and adjacent one another.

It is thus seen that a need exists for a system for conducting welding adjacent flammable materials, such as petroleum and other fuels and gases, in a safe and efficient manner without shutting down drilling operations. It is to the provision of such that the present invention is particularly directed.

SUMMARY OF THE INVENTION

In a preferred form of the invention, a system for conducting welding adjacent flammable materials on a platform comprises a chamber defining an interior space. A welding apparatus is operable within the interior space. A sensor is provided for sensing combustible gas in the interior space and generating a signal. A controller is in communication with the welding apparatus and the sensor controlling the operations of the welding apparatus in response to signals received from the sensor.

In another preferred form of the invention, a method for controllably conducting welding adjacent flammable materials on a drilling platform comprises the steps of building a chamber about an object on the platform to be welded in order to separate the object from adjacent flammable materials and to create a substantially sealed environment about the object, blowing air into the chamber to create a positive pressure within the chamber that inhibits combustible gases from entering the chamber, operating a welding torch within the chamber to repair the object while sensing inside the chamber for the presence of combustible gas above a pre-selected level, and ceasing the welding operations upon the sensing detecting combustible gas inside the chamber above the pre-selected level.

DETAILED DESCRIPTION OF THE DRAWINGS

Figure 1:
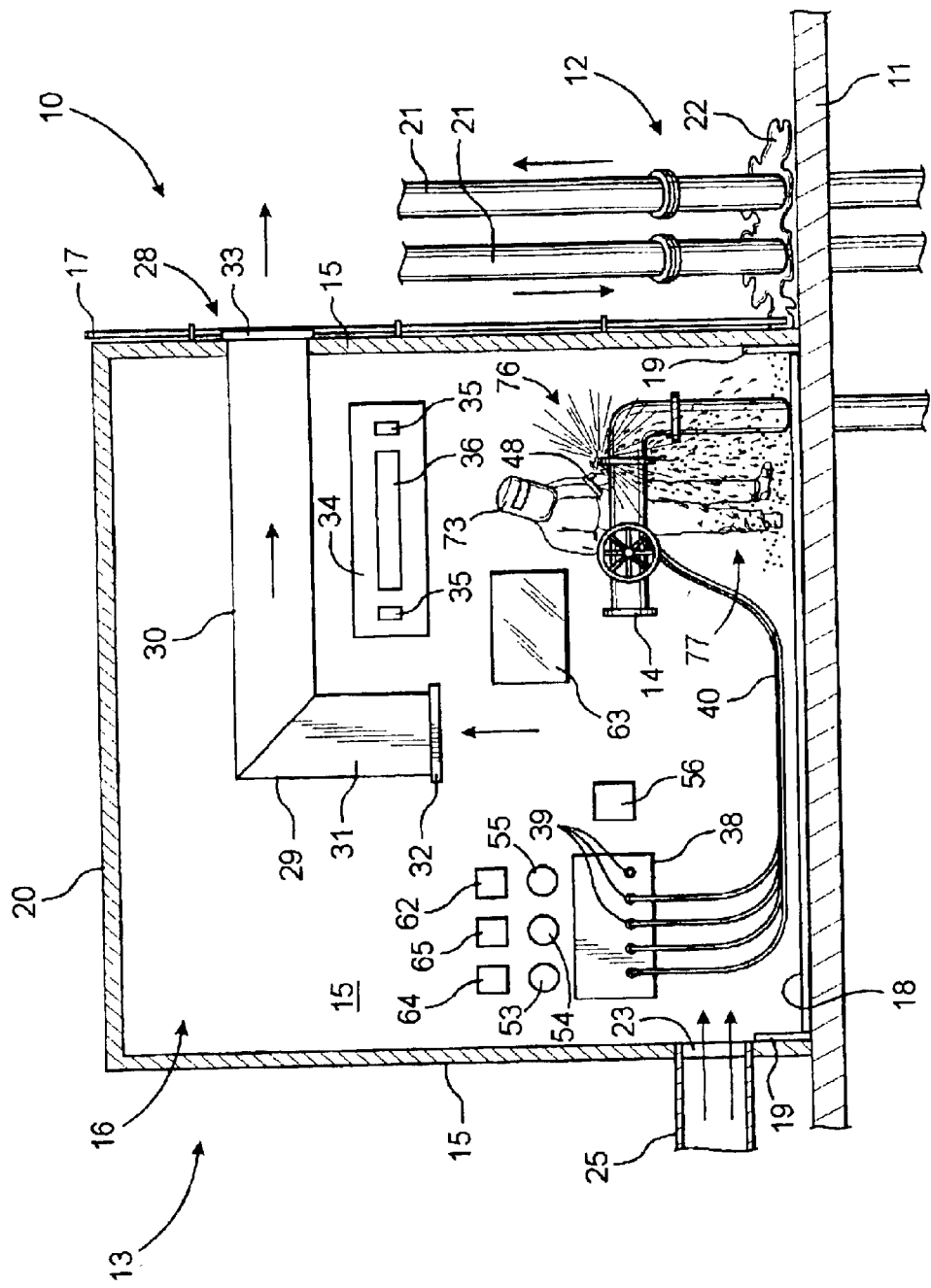
FIG. 1 is a perspective partial cross-sectional view of a system for conducting welding on a drilling platform adjacent flammable materials.

FIG. 1 is a perspective partial cross-sectional view of a system 10 for conducting welding on a drilling platform 11 adjacent flammable materials 12. The system 10 includes a chamber 13 erected about an object 14, such as a broken pipe, to be welded. The chamber 13 has a plurality of sides 15 that surround the object 14 and define an interior space 16. A floor 18 extends between the sides 15. A ceiling 20 extends between the sides 15 opposite the floor 18.

The sides 15 are preferably comprised of sheets of plywood mounted to a frame of wooden boards. The plywood and boards are fire-resistant, preferably treated by pressure impregnation with a fire-resistant treatment, such as Pyro-Guard®. Scaffolding framework 17 mounts to a deck of the platform 11 adjacent the chamber 13. The scaffolding 17 includes a series of interlocking metal pipes that preferably form a support frame that flanks the sides 15 of the chamber 13.

The floor 18 is preferably comprised of a sheet of 1/8" aluminum supported upon the platform 11. A side plate 19 attaches to a lower portion of each side 15. Each side plate 19 abuts the peripheral edges of the floor 18. The side plates 19 are also preferably comprised of aluminum sheets at least 1/8" thick and 6" high. The ceiling 20 is comprised of fire-resistant plywood and framing boards similar to the sides 15 of the chamber 13.

The chamber 13 may be constructed adjacent pipes 21, which contain petroleum that is flowing between different levels of the platform 11. The sides 15, the floor 18 and the ceiling 20 of the chamber 13 may contain cut-outs or holes as needed to allow the passage of the object 14 into the interior space 16, such that the chamber may be constructed about existing piping, wells and other objects. The chamber 13 may also be constructed adjacent petroleum 22 that has been spilt upon the platform 11.

A pair of first openings 23 are provided in one of the sides 15. A pair of blowers 24, shown in FIG. 2, attach to the chamber 13 adjacent the first openings 23 through a pair of flexible ducts 25. Each of the blowers 24 is in fluid communication with the interior space 16. The blowers 24 are preferably portable air driven blowers, such as an Allegro Industries Model No. 9508. Each of the blowers 24 has an intake manifold that is coupled to an air compressor 26. In this preferred configuration, each blower 24 supplies compressed air from the air compressor 26 to the interior space 16 of the chamber 13 at a rate of approximately 1800 CFM. A blower shutoff valve 27 couples to the air compressor 26. The blower shutoff valve 27 is a solenoid valve operable upon receiving an electrical signal, such as a Model No. 4262-A072 Air Intake Shutoff Valve sold by AMOT Controls Corporation.

A second opening 28 is provided in one of the sides 15 of the chamber 13. A ventilation duct 29 attaches to the chamber 13 adjacent the second opening 28. The ventilation duct 29 has a lateral extension 30 and a downward extension 31 extending downwardly from the lateral extension 30 to a central portion of the chamber 13. A grill 32 attaches to the open end of the downward extension 31. A set of framed, spring-loaded louvers 33 attach to the ventilation duct 29 opposite the grill 32.

An electrical panel 34 coupled to a 120 Volt AC power supply attaches to a side 15 of the chamber 13. Electrical power outlets 35 and lights 36 are electrically connected to the electrical panel 34 for supplying power and lighting to the interior space 16. A power switch 37 couples to the electrical panel 34 to control the flow of electricity to the electric panel.

A welding panel 38 attaches to a side 15 of the chamber 13. The welding panel 38 is preferably a junction box defining a plurality of holes 39 extending through the side 15 of the chamber 13 to which the welding panel is attached. A plurality of welding leads 40 attach to the welding panel 38 through the holes 39. The welding leads 40 are hoses or supply lines that are connected to a welding machine 41 and several gas tanks 42, 43 and 44. The welding machine 41 is a conventional diesel welding machine capable of performing welding, burning and cutting operations. The tanks 42, 43 and 44 hold gases such as argon, acetylene and oxygen that are used in conducting welding, burning and cutting operations. A welding torch 48 couples to each of the welding leads 40 opposite the panel 38. A welding machine shutoff valve 49 couples to the welding machine 41. The welding machine shutoff valve 49 is a solenoid valve operable upon receiving an electrical signal from a controller 66 that is described in detail below. The welding machine shutoff valve 49 is preferably similar to the blower shutoff valve 27 described above.

Each of the tanks 42, 43 and 44 has an associated tank shutoff valve 50, 51 and 52 and an associated supply line 45, 46 and 47 respectively. The supply lines 45, 46 and 47 connect to the welding torch 48. Each of the tank shutoff valves 50, 51 and 52 controls the flow of gas from the tanks 42, 43 and 44 to their respective supply lines 45, 46 and 47. Each of the tank valves 42, 43 and 44 is preferably a conventional solenoid valve, such as a Model No. 8223G10 sold by ASCO of Florham Park, N.J. Each of the tank valves 42, 43 and 44 operates to shutoff a respective gas supply line 45, 46 and 47 upon receiving an electrical signal from the controller 66.

A pressure sensor 53 mounts to the side 15 of the chamber 13 and couples to the controller 66. The pressure sensor 53 senses changes in air pressure in the interior space 16 of the chamber 13 and generates an electrical signal to the controller 66 upon detecting a change in pressure below a pre-selected level of pressure. The pre-selected level of pressure may be ambient pressure. The pressure sensor 53 is preferably an Explosion Proof Differential Pressure Switch, such as Model 1950, supplied by Dwyer Instruments, Inc. of Michigan City, Ind.

A gas detector 54 mounts to the side 15 of the chamber 13 and couples to the controller 66. The gas detector 54 monitors the interior space 16 of the chamber 13 for combustible gases and vapors, and upon detection of combustible gases or vapors above a pre-selected level, generates an electrical signal to the controller 66. The gas detector 54 has an explosion proof housing and a digital display. The gas detector 54 is preferably a Model S104-300-101-201 Smart Sensor gas detector supplied by General Monitors of Lake Forest, Calif. The gas detector 54 preferably couples to an amplifier, such as a Model TA102A Single-Channel Combustible Gas Trip Amplifier Module sold by General Monitors, that amplifies the electrical signal generated by the gas detector 54 prior to sending the signal to the controller 66.

An oxygen detector 55 mounts to the side of the chamber 13 and couples to the controller 66. The oxygen detector 55 detects oxygen in the interior space 16 of the chamber 13 and generates a signal upon detection of oxygen below a pre-selected level. The oxygen detector 55 is preferably a Model TS420 Oxygen Deficiency Detector sold by General Monitors and includes a field mounted display, such as an FMD 321-106-110, that provides an LCD readout of sensed oxygen.

An interior manual switch 56 mounts to a side 15 of the chamber 13. The interior manual switch 56 is preferably an explosion proof, mushroom shaped button switch that generates an electrical signal to the controller 66 upon being depressed.

A plurality of exterior gas detectors 57, 58, 59 and 60 mount to the platform 11 outside the chamber 13 and couple to the controller 66. The exterior gas detectors 57 and 58 are mounted adjacent the blowers 24. The exterior gas detector 59 is mounted adjacent the gas tanks 42, 43 and 44. The exterior gas detector 60 is mounted adjacent a doorway 61 to the chamber 13. The exterior gas detectors 57, 58, 59 and 60 are preferably similar to in type, style and operation to the interior gas detector 54.

The pressure sensor 53, the gas detectors 54, 57, 58, 59 and 60, the oxygen detector 55 and the interior manual switch 56 couple to a power supply module such as a Model PS002 Power Supply Module sold by General Monitors that generates 24 Volt DC power. A communications link 62 mounts to the chamber 13 for establishing audio communications between the interior 16 and exterior of the chamber. The communications link 62 is preferably a conventional intercom or a 2-way radio. A window 63 extends through the side 15 of the chamber 13 to enable visual communications between the interior 16 and exterior of the chamber. An interior audio alarm 64 and an interior visual alarm 65 mount to the chamber 13 and couple to the controller 66.

Figure 2:
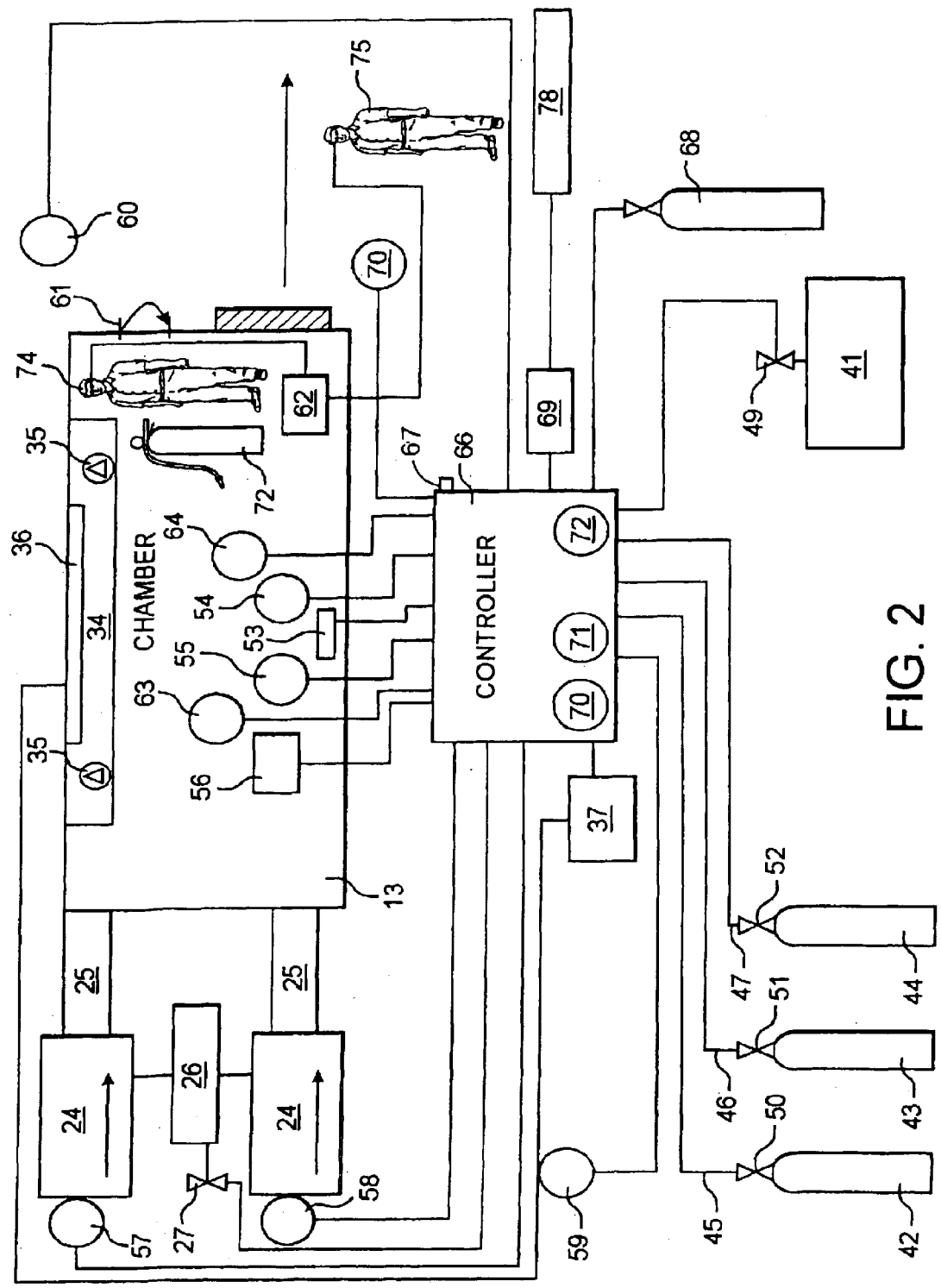
FIG. 2 is a schematic view of the system illustrated in FIG. 1.

The controller 66, shown in. FIG. 2, mounts to the platform 11 outside the chamber 13. The controller 66 includes an electrical distribution panel housed within a protected, sealed enclosure, preferably of the type provided by Bebco Industries of Texas City, Tex. The enclosure defines a cavity about its electrical distribution panel. The controller 66 is in electrical communication with the pressure sensor 53, the interior gas detector 54, the interior manual switch 56, the oxygen detector 55, and the exterior gas detectors 57, 58, 59 and 60. The controller is also in electrical communication with the blower shutoff valve 27, the electric panel power switch 37, the welding machine shutoff valve 49, and the tank shutoff valves 50, 51 and 52. Such electrical communication, for example, between the controller 66 and the pressure sensor 53, the interior gas detector 54, the interior manual switch 56, the oxygen detector 55, the exterior gas detectors 57, 58, 59 and 60, the blower shutoff valve 27, the electric panel power switch 37, the welding machine shutoff valve 49, and the tank shutoff valves 50, 51 and 52, may be established by wire or wireless connections.

An exterior control switch 67 mounts to the exterior of the controller 66 and is in electrical communication with the controller 66. The exterior control switch 67 is also electrically connected to the blower shutoff valve 27, the electric panel power switch 37, the welding machine shutoff valve 49, and the tank shutoff valves 50, 51 and 52. A pressurizing gas tank 68 attaches to the controller 66 and is in fluid communication with the cavity of the controller 66 that surrounds the electric distribution panel. The pressurizing tank 68 holds an inert shielding gas, such as argon or nitrogen, for purging the cavity of the controller 66.

The platform 11 has an electrical power source 78 for powering equipment, lighting, and HVAC used on the platform. An emergency shut down switch 69 is in electrical communication with the electrical power source 78 and the controller 66. An exterior visual alarm 70 and an exterior audio alarm 71 mount adjacent the controller 66. The exterior visual alarm 70 is preferably a strobe light or similar warning light. The exterior audio alarm 71 is preferably a siren or similar warning horn. The exterior visual alarm 70 and the exterior audio alarm 71 electrically couple to the controller 66. A fire extinguisher 72 is placed within the chamber 13. The fire extinguisher 72 is preferably a conventional water pressurized extinguisher.

The entryway 61 provided in the side 15 of the chamber 13 is preferably a door hingedly attached to one of the sides 15. Fire-resistant caulk is used to seal any seams in the chamber 13, for example, between the sides 15, the floor plate 18 and the side plates 19, and about any of the openings or cutouts made in the sides.

Operation of the system 10 preferably involves at least three individuals: a welder 73, a fire watch 74, and a controller operator 75. The welder 73 is located within the chamber 13 to perform welding operations. A fire watch 74 is also located within the chamber 13 to monitor the welding operations. Both the welder 73 and the fire watch 74 communicate to the exterior of the chamber 13 verbally using the communications link 62 and visually using the window 63. In addition, both the welder 73 and the fire watch 74 may activate the first manual switch 56 to discontinue operations of the blowers 24, the electrical panel 34, and the welding torch 48.

Prior to the welder 73 or the fire watch 74 entering the chamber 13 to conduct welding operations, the blowers 24 are activated to blow air into the chamber. The blowers 24 provide ambient air to the chamber 13 and create a positive pressure within the chamber that is higher than ambient pressure. The time required to pressurize the chamber 13 will depend upon the size of the chamber. However, at a flow rate of 1800 CFM per blower and using two blowers 24, pressurizing an 8'×8'×8' chamber 13 requires only a few minutes to achieve a pressure within the chamber that is higher than ambient pressure.

Once the chamber 13 is pressurized, the inert gas from the pressurizing gas tank 68 is released into the cavity of the controller 66 to pressurize the controller. Pressurization of the controller 66 with inert gas from the pressurization tank 68 shields any heat or sparks generated from the electrical circuitry within the controller from encountering flammable gases exterior to the controller.

The controller 66 is then activated and the power switch 37 is closed to supply electrical power to the electrical panel 34, the pressure sensor 53, the gas detectors 54, 57, 58, 59, and 60, and the oxygen sensor 55. Signals from the pressure sensor 53, the gas detectors 54, 57, 58, 59, and 60, and the oxygen sensor 55 are monitored to confirm that the chamber 13 is pressurized, that none of the gas detectors 54, 57, 58, 59, and 60 are detecting gas in the chamber or near the chamber, and that an acceptable level of oxygen is present in the chamber.

If the pressure sensor 53 indicates that the chamber 13 is pressurized, that none of the gas detectors 54, 57, 58, 59, and 60 are detecting gas, and that the oxygen detector 55 detects an acceptable level of oxygen in the chamber, the welder 73 and the fire watch 74 enter the chamber 13 through the entryway 61. It should be appreciated that opening the entryway 61 to the chamber 13 releases some of the air in the chamber 13 thereby decreasing temporarily the pressure within the chamber. Preferably, the blowers 24 are operating at a sufficient capacity to permit the entryway door 61 to be opened and closed at least once without reducing the pressure within the chamber 13 to a level near ambient pressure. If, however, the pressure within the chamber 13 dips below an acceptable level, the pressure sensor 53 will signal the controller 61 to activate the alarms 64, 65, 70, and 71 and to open the power switch 37. In that event, the welder 73 and the fire watch 74 must wait another few minutes for the blowers 24 to re-pressurize the chamber 13 to a level sufficiently higher than before so that opening of the entryway 61 will not reduce the chamber pressure to below ambient pressure. Signaling of low chamber pressure by the pressure sensor 53 to the controller 66 does not interrupt the continued operation of the blowers 24 which are pressurizing the chamber 13.

Once inside the chamber 13, the welder 73 or the fire watch 74 reads the field mounted display of the oxygen detector 55 to confirm that an oxygen level sufficient to support their breathing is present within the chamber 13. The welder 73 and the fire watch 74 also confirm that the communications link 62 and the electric panel 34 are operable. If the field mounted display of the oxygen detector 55 indicates that sufficient oxygen is present, and if the communications link 62 and electric panel 34 are operable, the welding machine 41 is energized and the welding torch 48 is lit so that welding operations may begin.

Welding creates intense heat from a flame or electric arc generated by the welding torch 48 as well as sparks 76 and slag 77 caused from contact of the flame or arc with the metal object 14. The sparks 76 spray outwardly from the object 14 and the slag 77 falls downwardly. As the sparks 76 and slag 77 travel from the point at which the torch flame contacts the object 14, the sparks 76 and the slag 77 begin to cool.

The sides 15, the side plates 19 and the floor 18 of the chamber 13 contain the sparks 76 and the slag 77 within the chamber 13. The ventilation duct 29 also prevents the sparks 76 and slag 77 from escaping the chamber 13 prior to cooling. In particular, the grill 32 of the ventilation duct 29 serves as a filter to inhibit sparks 76 and slag 77 from passing through the grill and entering the downward extension 31. Also, the length of the lateral extension 30 is preferably at least several feet such that in the event that sparks 76 or slag 77 were to inadvertently enter the downward extension 31, the time required to travel the length of the lateral extension toward the second opening 28 is sufficient to enable the sparks and slag to cool prior to exiting the chamber 13.

The pressurization of the chamber 13 by the blowers 24 inhibits flammable gases and vapors from entering the chamber. Signaling to the controller 66 the presence of combustible gases exterior to the chamber 13 by the exterior gas detectors 57, 58, 59, and 60 also inhibits flammable gases and vapors from entering the chamber 13 during welding operations. If any of the exterior gas detectors 57, 58, 59, and 60 detects the presence of combustible gas, a signal is sent to the controller 66. In turn, the controller 66 activates the blower shutoff valve 27, the power switch 37, the welding machine shutoff valve 49, the tank shutoff valves 50, 51 and 52, and the alarms 64, 65, 70 and 71. In addition, the controller 66 may also activate the emergency shut down switch 69 to immediately shut down all electrical operations on the platform 11.

If the interior gas detector 54 detects the presence of gas within the chamber 13, the interior gas detector signals the controller 66. In turn, the controller 66 activates the blower shutoff valve 27, the power switch 37, the welding machine shutoff valve 49, the tank shutoff valves 50, 51 and 52, the emergency shut down switch 69, and the alarms 64, 65, 70 and 71.

If the oxygen detector 55 detects a low level of oxygen within the chamber 13, the oxygen detector signals the controller 66. In turn, the controller 66 activates the power switch 37, the welding machine shutoff valve 49, the tank shutoff valves 50, 51 and 52, and the alarms 64, 65, 70 and 71. The blowers 24 preferably continue to operate after the oxygen detector 55 signals the controller 66 to raise the oxygen level within the chamber 13 by blowing air into the chamber.

In the event another problem is detected, for example, if a fire ignites within the chamber 13, a blowout occurs on the platform 11, or unfavorable weather conditions threaten the platform, the first manual switch 56, the exterior control switch 67 or the emergency shut down switch 69 may be depressed. Depression of the first manual switch 56 or the exterior control switch 67 signals the controller 66 to activate the blower shutoff valve 27, the power switch 37, the welding machine shutoff valve 49, the tank shutoff valves 50, 51 and 52, and the alarms 64, 65, 70 and 71. Depression of the emergency shut down switch 69 shuts down the electrical power source 78 for the platform 11 thereby ceasing all electrical operations on the platform.

It is preferred that the chamber 13 is erected on a horizontal surface of the platform 11. However, it should be appreciated that the scaffolding 17 may be mounted in other configurations, such as protruding outwardly in a lateral direction from a side of the platform 11 in order to establish a foundation for a chamber 13 that mounts to the side of a platform. For example, to repair an object 14 laterally positioned to the platform 11, scaffolding framework 17 might be erected outwardly from a side of the platform. In such a configuration, the scaffolding 17 rather than the platform 11 itself would serve to support the floor 18 of the chamber 13. It should also be appreciated that although the scaffolding 17 and sides 15 of the chamber 13 have been illustrated in a rectangular configuration, the chamber may take the shape of any number of configurations depending upon obstacles, such as active pipelines and other structures, about which the proposed welding area, i.e. the interior space 16, is located.

It is also preferred that the emergency shut down switch 69 although illustrated adjacent the controller 66 is operable not only by an operator located adjacent the controller 66, but also by an operator that is controlling operations of the platform 11. In this manner, a platform operator may observe operations of the chamber 13 from a distance and upon hearing or seeing any warnings from the alarms 64, 65, 70 and 71 may activate the emergency shut down switch 69 to prevent ignition or explosion of flammable materials during welding operations in the chamber. Additionally, the first manual switch 56 may be in electrical communication with the emergency shut down switch 69 directly or through the controller 66 so that activation of the first manual switch shuts down the platform power source 78.

Although the system 10 has been illustrated and described in connection with welding utilities, it should be appreciated that the system 10 is not limited to controlling welding operations adjacent flammable materials. Applications of other industrial utilities, for example painting, sanding, grinding, or other machining operations, could be controllably operated within the chamber 13 adjacent flammable materials using the above-described system.

From the foregoing, it is seen that a new system for controllably conducting welding adjacent flammable materials is now provided which overcome problems associated with those of the prior art. It should, however, be understood that the just described system merely illustrates principles of the invention in preferred forms. Many modifications, additions and deletions may, of course, be made thereto without departure from the spirit and scope of the invention as set forth in the following claims.

We claim:

1. A system for conducting welding adjacent flammable materials on a platform, the system comprising
   a chamber defining an interior space;
   a welding apparatus operable within said interior space;
   a blower in fluid communication with said interior space and in communication with said controller, whereby the controller controls the operation of the blower in response to signals received from the sensor,
   a sensor for sensing combustible gas in said interior space and generating a signal in response to said sensor sensing of a pre-determined level of combustible gas; and
   a controller in communication with said welding apparatus and in communication with said sensor, said controller being capable of controlling the operation of the welding apparatus,
   whereby the controller controls the operations of the welding apparatus in response to signals received from the sensor.

2. The system of claim 1 wherein said system further comprises an air pressure sensor for sensing the air pressure in said interior space and generating an air pressure signal in response to the sensing of an interior air pressure below a pre-selected level, said air pressure sensor being in communication with said controller, whereby the controller controls operations of the welding apparatus in response to air pressure signals received from the air pressure sensor.

3. The system of claim 1 further comprising a detector for detecting oxygen levels in said interior space and generating an oxygen level signal, said detector being in fluid communication with said controller, whereby the controller controls operations of the welding apparatus in response to oxygen level signals received from the oxygen detector.

4. The system of claim 1 further comprising an electric panel in communication with said controller for supplying electricity to said interior space, whereby the controller controls the electric panel in response to signals received from the sensor.

5. A system for conducting welding adjacent flammable materials on a platform, the system comprising
   a chamber defining an interior space;
   a welding apparatus operable within said interior space;
   a sensor for sensing combustible gas in said interior space and generating a first signal in response to said sensor sensing a pre-determined level of combustible gas, an exterior sensor for sensing combustible gas outside of said interior space and generating a second signal, said exterior sensor being in communication with said controller;
   a controller in communication with said welding apparatus and in communication with said sensor, said controller being capable of controlling the operation of the welding apparatus,
   whereby the controller controls the operations of the welding apparatus in response to the first signal and the second signal.

6. The system of claim 5 further including a blower in fluid communication with said interior space and in communication with said controller, whereby the controller controls operations of the blower in response to the first signal or the second signal.

7. A method for controllably conducting welding adjacent flammable materials on a drilling platform comprising the steps of:
   (a) Building a chamber about an object on the platform to be welded in order to separate the object from adjacent flammable materials and to create a substantially sealed environment about the object,
   (b) Blowing air into the chamber to create a positive pressure within the chamber that inhibits combustible gases from entering the chamber,
   (c) Operating a welding torch within the chamber to repair the object while sensing inside the chamber for combustible gas above a pre-selected level, and
   (d) Ceasing the welding operations upon the sensing detecting combustible gas inside the chamber above the pre-selected level.

8. The method of claim 7 wherein in step (c) sensing is also performed outside the chamber for the presence of combustible gas above a pre-selected level and wherein in step (d) welding operations are ceased upon the sensing detecting combustible gas inside the chamber or outside the chamber.

9. The method of claim 7 wherein in step (b) a blower is used to blow air into the chamber, and in step (d) operations of the blower are ceased upon detecting combustible gas inside the chamber.

10. The method of claim 7 wherein following step (d) the combustible gas is removed from inside the chamber and steps (b) through (d) are repeated.

11. The method of claim 7 wherein in step (c) sensing is also performed for the presence of oxygen within the chamber and in step (d) welding operations are ceased upon detecting that the level of oxygen within the chamber is below a pre-selected level.

12. The method of claim 7 further comprising step (e) drilling operations for flammable materials are performed on the platform concurrently with the welding operations and upon detecting combustible gas within the chamber above the pre-selected level, one or more of the drilling operations are ceased.

13. A method for controllably conducting welding adjacent flammable materials on a drilling platform comprising the steps of:
   (a) Building a chamber about an object on the platform to be welded in order to separate the object from adjacent flammable materials and to create a substantially sealed environment about the object,
   (b) Blowing air into the chamber to create a positive pressure within the chamber that inhibits combustible gases from entering the chamber,
   (c) Operating a welding torch within the chamber to repair the object while sensing outside the chamber combustible gas above a pre-selected level, and
   (d) Ceasing the welding operations upon the sensing detecting combustible gas outside the chamber above the pre-selected level.

14. The method of claim 13 wherein in step (c) sensing is also performed inside the chamber for the presence of combustible gas above a pre-selected level and wherein in step (d) welding operations are ceased upon the sensing detecting combustible gas outside the chamber or inside the chamber.

15. The method of claim 13 wherein in step (b) a blower is used to blow air into the chamber, and in step (d) operations of the blower are ceased upon detecting combustible gas outside the chamber.

16. The method of claim 13 wherein following step (d) the combustible gas is removed from outside the chamber and steps (b) through (d) are repeated.

17. The method of claim 13 wherein in step (c) sensing is also performed for the presence of oxygen within the chamber and in step (d) welding operations are ceased upon detecting that the level of oxygen within the chamber is below a pre-selected level.

18. The method of claim 13 further comprising step (e) drilling operations for flammable materials are performed on the platform concurrently with the welding operations and upon detecting combustible gas adjacent the chamber above the pre-selected level, one or more of the drilling operations are ceased.

* * * * *

US006783054C1

(12) INTER PARTES REEXAMINATION CERTIFICATE (0077th)
United States Patent
Pregeant, Jr. et al.

(10) Number: US 6,783,054 C1
(45) Certificate Issued: Jun. 30, 2009

(54) SYSTEM FOR CONTROLLABLY CONDUCTING WELDING OPERATIONS ADJACENT FLAMMABLE MATERIALS AND METHOD OF WELDING ADJACENT FLAMMABLE MATERIALS

(75) Inventors: Clyde W. Pregeant, Jr., Cut Off, LA (US); Richard J. Pregeant, Lochport, LA (US); Mark A. Pregeant, Galliano, LA (US); Glenn R. Payton, Gretna, LA (US); James R. Craig, Belle Chasse, LA (US)

(73) Assignee: Alford Safety Services, Inc., Houma, LA (US)

Reexamination Request:
No. 95/000,148, Nov. 22, 2006
No. 90/008,050, Jun. 1, 2006

Reexamination Certificate for:
Patent No.: 6,783,054
Issued: Aug. 31, 2004
Appl. No.: 10/155,716
Filed: May 20, 2002

(51) Int. Cl.
*B23K 9/10* (2006.01)
*B23K 31/02* (2006.01)

(52) U.S. Cl. .............................. 228/102; 228/8; 228/103; 228/119; 219/72; 219/130.01; 454/228

(58) Field of Classification Search .................... None
See application file for complete search history.

(56) References Cited

U.S. PATENT DOCUMENTS

| 5,101,604 A | 4/1992 | Wardlaw, III |
| 6,783,054 B1 | 8/2004 | Pregeant, Jr. et al. |

FOREIGN PATENT DOCUMENTS

GB 2311847 10/1997

OTHER PUBLICATIONS

Norsok Standard—Temporary Equipment; Z–015; Rev. 1, Jul. 1998.
Electrical Safety in Hazardous Environments, Apr. 19–21, 1994; Conference Publication, No. 390. IEE, 1994. Current Appln. of Oil–Well Equipment in Hazardous Areas; C.G. Casso.
Technor Multi–channel Mobile Gas Detection System TN 99–4 for offshore uses allows "hot work" in Ex–areas (Zones 1 and 2).
Environmental Control Unit Division Technical Bulletin WDP–12–R1.2, (May 1997); Model WDP–12, Wall Mount Dual Blower Building Pressurization Unit—Bebco Industries.
Environmental Control Unit Division Technical Bulletin GD–R–R1, (May 1997); Model GD & GDSB, Gas Detector Sensors, Monitors, Power Supplies & Mounting Brackets—Bebco Industries.
Environmental Control Unit Division Document WDP–12 1OM–R1.0, (Feb. 1997) Wall Mount Dual Blower Building Pressurization Unit Installation and Ooperation Manual—Bebco Industries.
D. Parascin, "Welding Enclosure Eliminates Platform Shut–in", Oil and Gas Journal (May 4, 1998).

(Continued)

*Primary Examiner*—Joseph A. Kaufman

(57) ABSTRACT

A system (10) for conducting welding adjacent flammable materials (12) on a platform (11) is disclosed having a chamber (13) defining an interior space (16). The system also includes a welding apparatus (48) operable within the interior space. A sensor (54) is provided for sensing the presence of combustible gas within the interior space above a pre-selected level and generating a signal. An exterior sensor (57) is provided for sensing the presence of combustible gas outside the interior space above a pre-selected level and generating a signal. A controller (66) is in communication with the welding apparatus, the sensor, and the exterior sensor to control the operations of the welding appartus in response to signals received from the sensor.-

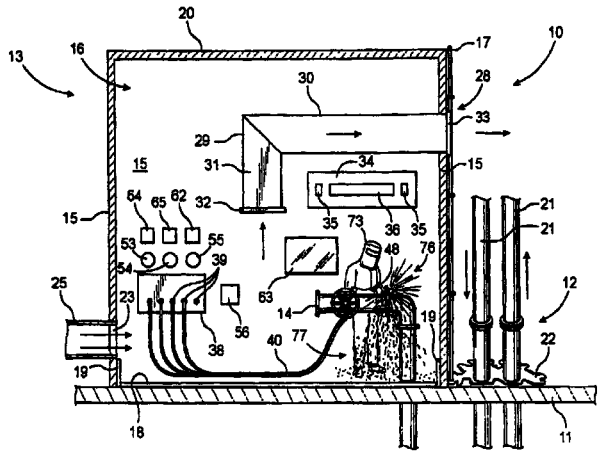

OTHER PUBLICATIONS

29 CFR 1910.146(b); 146(C)(5)(ii)(E); 146(C)(5)(ii)(G); 146(d)(5); 146(d)(6).
30 CFR 250.113.
46 CFR 108.185.
NFPA 496 A–2–10.
API 500 6.2; 6.52.
API 14C C.1.3.
I.G. Browning, "Welding Hot Work Habitats" Society of Petroleum Engineers (1994).
29 USC §653 (1998).
43 USC §1331 (2000).
29 CFR § 1910 Sub. Q, 1910.146, 1910.399, 1915.12, 1926.353 (1998).
30 CFR 250.107, 250.198, 250.113, 250.114, 250.459, 250.803 (2000).
46 CFR 108.085, 111.103, 111.105–33 (2000).
Memorandum of Understanding between the United States Coast Guard, The Department of Transportation and the Occupational Safety and Health Administration, The Department of Labor Concerning Occupation Safety and Health on Artificial Islands,Installations and Other Devices on the Outer Continental Shelf on the United States (1979).
MMS Production Inspection Form Procedural Handbook (2000).
Memorandum of Understanding between Minerals Management Service, US. Department of the Interior and United States Coast Guard, U.S. Department of Transportation (1998).
API 500–Recommended Practice for Classification of Locations for Electrical Installatons at Petroleum Facilities Classified as Class 1, Division 1 and Division 2. (1997).
API 14C "Recommended Practice for Analysis, Design, Installaton, and Testing of Basic Surface Safety Systems for Offshore Production Platforms," American Petroleum Institute (1998).
API 14F "Recommended Practice for Design and Installation of Electrical Systems for Fixed and Floating Offshore Petroleum Facilities for Unclassified and Class 1, Division 1 and Division 2 Locations," American Petroleum Institue (1999).
NFPA 496 "Standard for Purged and Pressurized Enclosures for Electrical Equipment," National Fire Prevention Association (1998).
American National Standard Institute ANSI Z117.1:1995— "Safety Requirements for Confined Spaces" American Society of Safety Engineers (1995).
American National Standard Institute ANSI Z49.1:1999— "Safety in Welding, Cutting and Allied Processes" American Society of Safety Engineers (1999).
Australian Standard 2865–1995—"Safe working in a confined space".
Confined Spaces Regulation 1999—"Safe work in confined spaces," Health and Safety Commission, HSE Books (1997).
Woodside Energy Limited Engineering Excellence Awards 1999, North Rankin A Fire & Gas System Replacement Project (1999).
D. Parascin, "Welding Enclosure eliminates platform shut–in," Oil & Gas Journal (May 4, 1998).
SPE (Society of Petroleum Engineers) 27238, Welding Hot Work Habitats SPE Health, Safety and Environmental in Oil and Gas Exploration and Production Conference, Jan. 25–27, 1994, Jakarta, Indonesia; Author: Browning, I.G.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3 and 6–18 are cancelled.

Claims 1 and 5 are determined to be patentable as amended.

Claim 4, dependent on an amended claim, is determined to be patentable.

1. A system for conducting welding adjacent flammable materials on a platform, the system comprising
   a chamber defining an interior space;
   a controller;
   *a pressure sensor located within said chamber for sensing the change in air pressure in said chamber, which pressure sensor is capable of generating an electrical signal to the controller upon sensing a change in pressure below a pre-selected level of pressure;*
   *an oxygen sensor located within said chamber for sensing the level of oxygen within said chamber;*
   *at least one gas detector located outside of said chamber, which at least one gas detector is capable of sensing the presence of combustible gases;*
   a welding apparatus operable within said interior space;
   *a manual emergency shutdown switch located within said chamber;*
   a blower in fluid communication with said interior space and in communication with said controller, whereby the controller controls the operation of the blower in response to signals received from the [sensor] *at least one gas detector located outside of said chamber;*
   a [sensor] *gas detector located within said chamber capable of* [for sensing] *detecting* combustible gas in said interior space and generating a signal in response to said [sensor sensing of] *detector detecting* a predetermined level of combustible gas; and
   [a] *said* controller in communication with said welding apparatus and in communication with said [sensor] *pressure sensor, said oxygen sensor, said at least one gas detector located outside of said chamber, said manual emergency shutdown switch, and said gas detector located inside of said chamber,* said controller being capable of controlling the operation of the welding apparatus,
   [whereby the controller controls the operations of the welding apparatus] in response to signals received from [the sensor] *one or more of said pressure sensor, said oxygen sensor, said at least one gas detector located outside of said chamber, said manual emergency shutdown switch, and said gas detector located inside of said chamber, and wherein said controller is also capable of allowing said blower to continue to operate in the event of a signal from said pressure sensor that the pressure in said chamber has been reduced to atmospheric pressure.*

5. A system for conducting welding adjacent flammable materials on a platform, the system comprising
   a chamber defining an interior space;
   *a controller;*
   a welding apparatus operable within said interior space;
   a [sensor] *first gas detector located within said chamber* for [sensing] *detecting* combustible gas in said interior space and generating a first signal in response to said [sensor sensing] *gas detector detecting* a predetermined level of combustible gas, [an] *a second gas detector* exterior [sensor] *of said chamber* for [sensing] *detecting* combustible gas outside of said interior space and generating a second signal, said [exterior sensor] *second gas detector* being in communication with said controller;
   [a] *said* controller in communication with said welding apparatus and in communication with said [sensor] *first and second gas detectors,* said controller being capable of controlling the operaton of the welding apparatus;
   *a blower in fluid communication with said interior space and in communication with said controller;*
   whereby the controller controls the operations of the *blower and* welding apparatus in response to the first signal and the second signal.

\* \* \* \* \*